(12) United States Patent
Avupati et al.

(10) Patent No.: US 12,142,898 B2
(45) Date of Patent: Nov. 12, 2024

(54) ADJUSTABLE ELECTRIC INSULATING DEVICE

(71) Applicant: Honeywell International Inc., Charlotte, NC (US)

(72) Inventors: Ravi Kumar Avupati, Telangana (IN); Prudhvi Krishna Yarlagadda, Hyderabad (IN); Ravi Teja Tata, Andhra Pradesh (IN); Ataur Rahman, Andhra Pradesh (IN); Ashish Jain, Uttar Pradesh (IN); Rizwan Ahmad, Telangana (IN)

(73) Assignee: Honeywell International Inc., Charlotte, NC (US)

( * ) Notice: Subject to any disclaimer, the term of this patent is extended or adjusted under 35 U.S.C. 154(b) by 1085 days.

(21) Appl. No.: 17/031,148

(22) Filed: Sep. 24, 2020

(65) Prior Publication Data
US 2022/0094145 A1    Mar. 24, 2022

(51) Int. Cl.
*H02G 1/02*    (2006.01)
*H01R 11/14*    (2006.01)

(52) U.S. Cl.
CPC .................................... *H02G 1/02* (2013.01)

(58) Field of Classification Search
CPC ................................ H02G 1/02; H01R 11/14
USPC ................................................ 294/210, 174
See application file for complete search history.

(56) References Cited

U.S. PATENT DOCUMENTS

| | | | |
|---|---|---|---|
| 4,447,048 A * | 5/1984 | Fischer ................ | B25J 17/0208 267/141.1 |
| 5,114,109 A * | 5/1992 | Fitz ........................ | F16M 11/28 248/404 |
| 5,322,334 A * | 6/1994 | Hammer .................. | B25G 1/04 15/144.4 |
| 8,733,712 B2 * | 5/2014 | Xu ........................ | F16M 13/04 248/404 |
| 10,625,413 B1 * | 4/2020 | McPherson .......... | B25J 15/0213 |
| 11,283,203 B1 * | 3/2022 | Avupati ................... | H02G 1/02 |
| 11,311,998 B1 * | 4/2022 | Lofley, Jr. ................ | B25G 1/04 |
| 2009/0121505 A1 * | 5/2009 | Shatilla ...................... | B25J 1/04 320/114 |
| 2012/0024091 A1 * | 2/2012 | Kawabuchi ............. | F16G 13/20 901/30 |
| 2018/0066792 A1 * | 3/2018 | Chen .................... | F16M 11/041 |

(Continued)

*Primary Examiner* — Paul T Chin
(74) *Attorney, Agent, or Firm* — Alston & Bird LLP

(57) ABSTRACT

An adjustable insulating device is provided. An example device includes a housing and an extendable member at least partially located within the housing. The extendable member moves between a retracted position and an extended position. The device further includes an adjustment mechanism operably coupled with the extendable member. The adjustment mechanism causes translation of the extendable member between the retracted position and the extended position. The adjustment mechanism includes a first roller rotationally engaged with the extendable member at a first position that houses a first motor, and a second roller rotationally engaged with the extendable member at a second position that houses a second motor. An output of the first motor and an output of the second motor are configured to cause translation of the extendable member between the retracted position and the extended position, via the first roller and the second roller.

18 Claims, 5 Drawing Sheets

(56) References Cited

U.S. PATENT DOCUMENTS

2018/0115090 A1* 4/2018 Rahman .................. H02P 6/28
2019/0190171 A1* 6/2019 Rahman .................. H01R 4/52

* cited by examiner

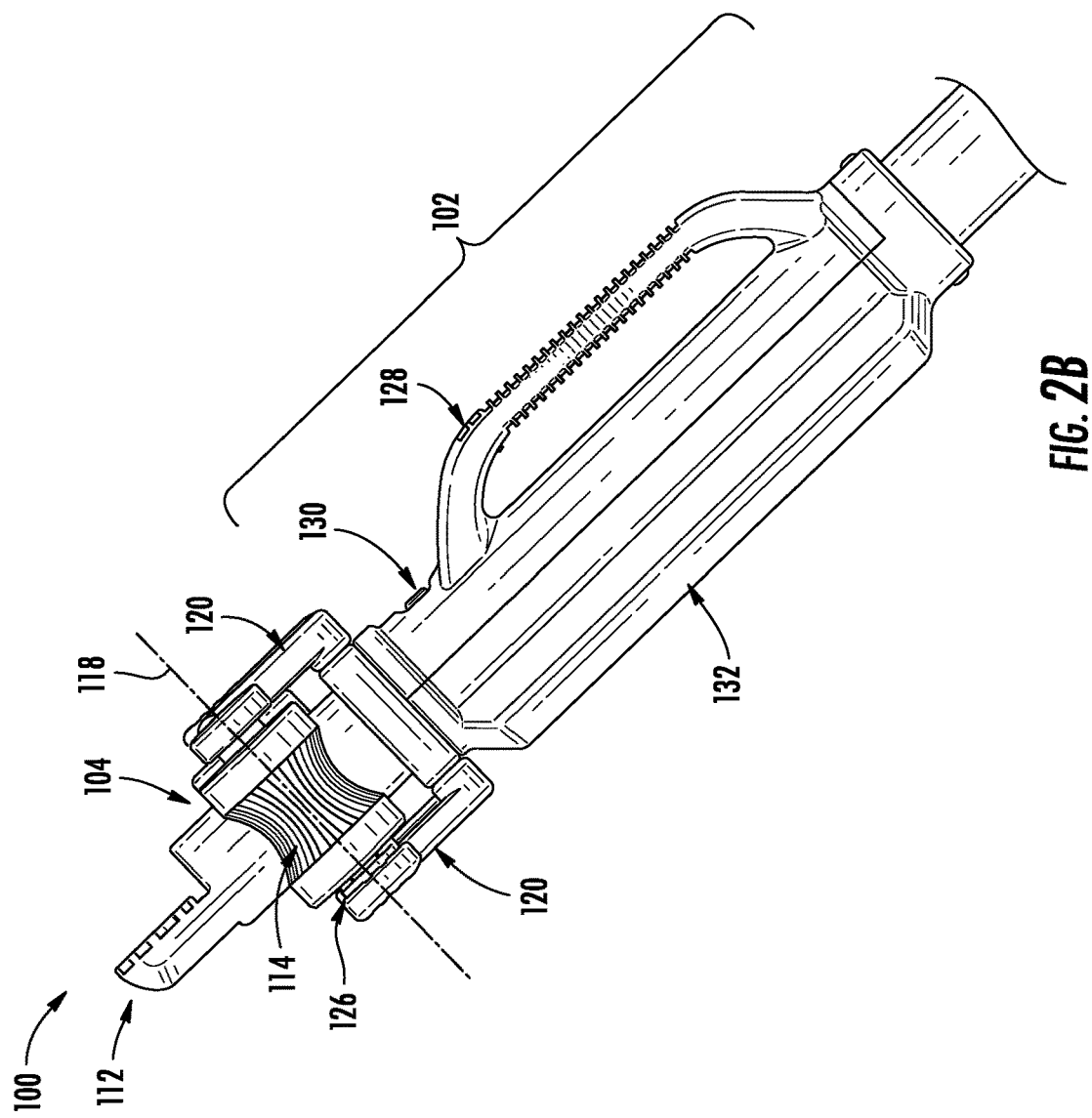
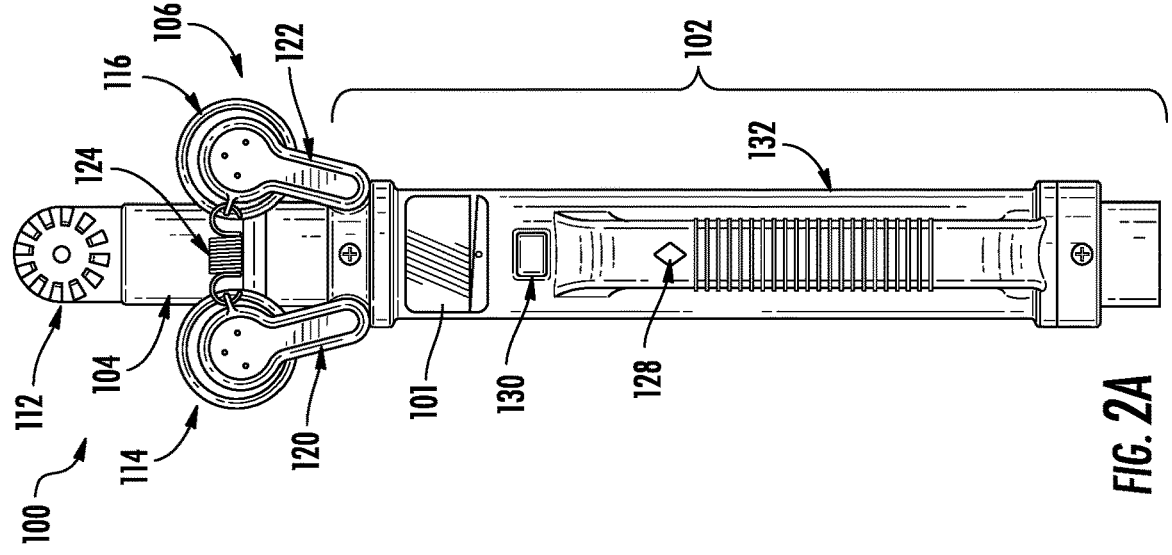

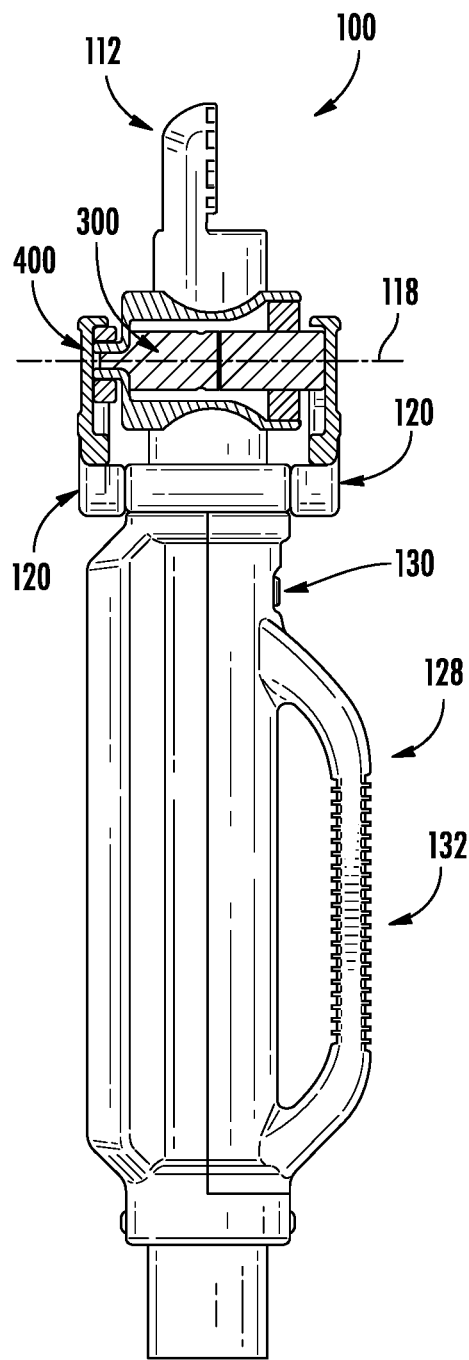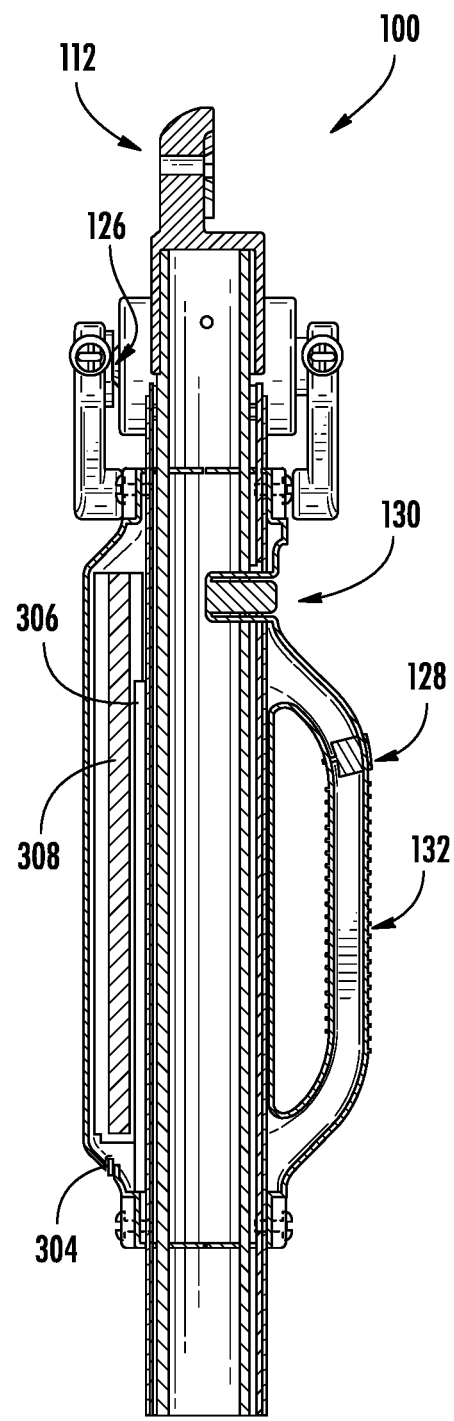
FIG. 4A
FIG. 4B

ADJUSTABLE ELECTRIC INSULATING DEVICE

TECHNOLOGICAL FIELD

Example embodiments of the present invention relate generally to electrical systems and, more particularly, to grounding and insulating devices.

BACKGROUND

Electrical linemen are often concerned with preventing electrical shocks, especially when working with high voltage/amperage applications. Linemen may use an elongate stick, pole, hot stick, or shotgun stick to engage an electrical conductor (e.g., an electric wire, post, or ball stud) and ground the electrical conductor without de-energizing the electrical conductor. Applicant has identified a number of deficiencies and problems associated with conventional insulating devices. Through applied effort, ingenuity, and innovation, many of these identified problems have been solved by developing solutions that are included in embodiments of the present invention, many examples of which are described in detail herein.

BRIEF SUMMARY

Conventional grounding or insulating devices, hot sticks, shotgun sticks, and the like allow for electrical linemen to prevent electrical shocks by grounding an electrical connection. These conventional devices, however, are often bulky and/or difficult to use. For example, an electrical lineman may be required to extend a hot stick overhead to connect to an overhead power line. Due to the operating height of some electrical conductors, for example overhead electrical power lines, these traditional devices require a lineman or operator to manually extend the device to a sufficient height to engage the electrical conductor. Similarly, these traditional devices require an operator to manually retract the grounding device after use such that the operator is required to stabilize a bulky, elongate device overhead for an inordinate amount of time. Such a process is not only time consuming but also dangerous to the operator. In this way, conventional insulating and grounding devices fail to effectively and efficiently extend to and retract from operational heights resulting in potential danger to the lineman. Apparatuses, systems, and associated methods are described for use with adjustable insulating devices that address these deficiencies and others by utilizing an adjustment mechanism configured to translate an extendable member between a retracted and an extended position via one or more motorized roller systems.

An adjustable insulating device is provided that includes a housing and an extendable member configured to be at least partially located within the housing. The extendable member may be configured to move between a retracted position and an extended position. The adjustable insulating device may further include an adjustment mechanism operably coupled with the extendable member. The adjustment mechanism may be configured to cause translation of the extendable member between the retracted position and the extended position.

In some embodiments, the extendable member may be formed of two or more telescoping sections. In such an embodiment, in the retracted position, the telescoping sections of the extendable member may be configured to nest within the housing.

In some embodiments, the housing may define a first end and a second end opposite the first end. In such an embodiment, the extendable member may include a base section and an end section. In the retracted position, the base section may be configured to be enclosed by the housing, and the end section may be configured to be disposed proximate the first end of the housing. In the extended position, the base section may be configured to be positioned proximate the first end of the housing, and the end section may be configured to be positioned beyond an outer edge of the housing. In some further embodiments, the end section may include a universal connector configured to operably connect with or more tool attachments.

In some embodiments, the housing and the extendable member may be formed of an electrically insulating material.

In some embodiments, the adjustment mechanism may further include a roller rotationally engaged the extendable member and a motor operably connected with the roller such that an output of the motor causes rotation of the roller. The output of the motor may be configured to cause translation of the extendable member between the retracted position and the extended position.

In some embodiments, the adjustment mechanism further includes a first roller rotationally engaged with the extendable member at a first position, and the first roller houses a first motor. The adjustment mechanism may further include a second roller rotationally engaged with the extendable member at a second position, and the second roller houses a second motor. An output of the first motor and an output of the second motor may be configured to cause translation of the extendable member between the retracted position and the extended position. In such an embodiment, the adjustment mechanism may include one or more bearings configured to reduce rotational friction of the first roller and the second roller.

In some further embodiments, an output shaft of the first motor may be substantially aligned with an axis of rotation of the first roller, and an output shaft of the second motor may be substantially aligned with an axis of rotation of the second roller.

In some still further embodiments, the adjustment mechanism may also include a first set of linkages configured to pivotally attach the first roller to the housing, and a second set of linkages configured to pivotally attach the second roller to the housing.

In some still further embodiments, the adjustment mechanism may include spring elements connected between the first set of linkages and the second set of linkages. The spring elements may be configured to urge the first roller and the second roller into contact with the extendable member.

In some embodiments, the device may further include an input element operably coupled with the adjustment mechanism and configured to receive a user input. In such an embodiment, the input element may when actuated in a first direction, cause translation of the extendable member to the extended position. The input element may also, when actuated in a second direction cause translation of the extendable member to the extended position.

In some embodiments, the device may further include a locking mechanism attached to the housing and configured to, when actuated, prevent translation of the extendable member.

In some embodiments the housing further comprises a handle enclosure. In such an embodiment, the device may further include control circuitry supported by the handle enclosure and operably coupled with the adjustment mechanism. In some further embodiments, the device may include an internal power source supported by the handle enclosure and operably coupled with the control circuitry and the adjustment mechanism. A power input connection operably coupled with the internal power source and configured to electrically connect the internal power source with an external power source may also be included.

In some further embodiments, the device may include a position sensor operably connected to the adjustment mechanism, the control circuitry, and the internal power source. The position sensor may be configured to determine the relative position of the extendable member and the housing.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

FIGS. 2A-2B are front and side views, respectively, of an example adjustment mechanism according to an example embodiment;

FIGS. 4A-4B are side cross-sectional views of an adjustable insulating device according to an example embodiment.

DETAILED DESCRIPTION

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

Figure 1A:
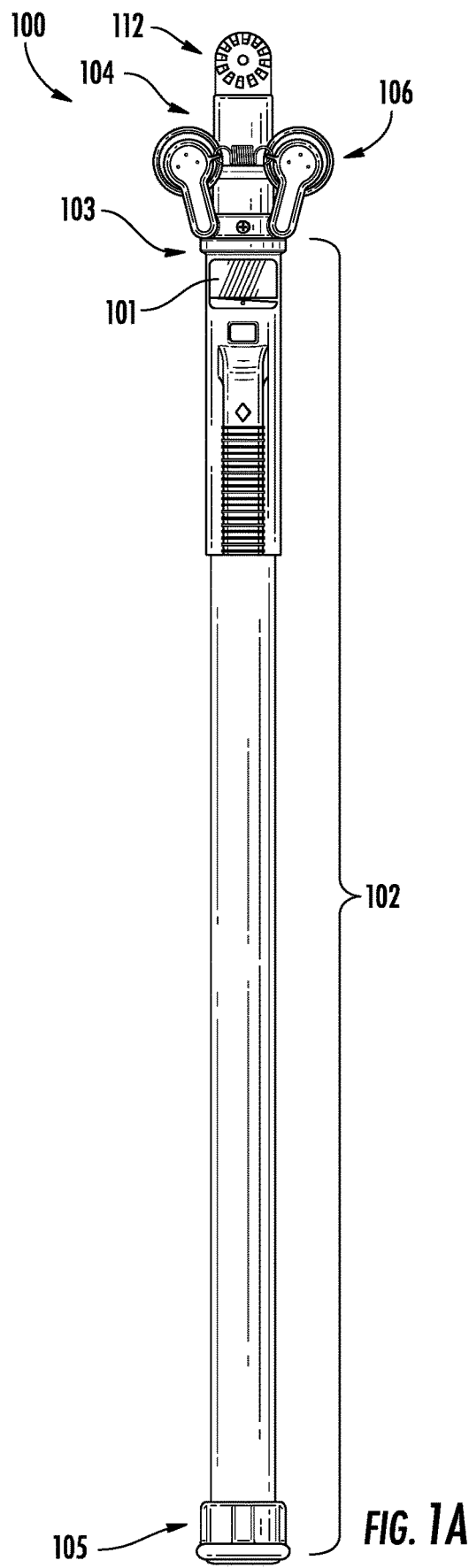
FIG. 1A is a front view of an example adjustable insulating device in a retracted position according to an example embodiment.
Figure 1B:
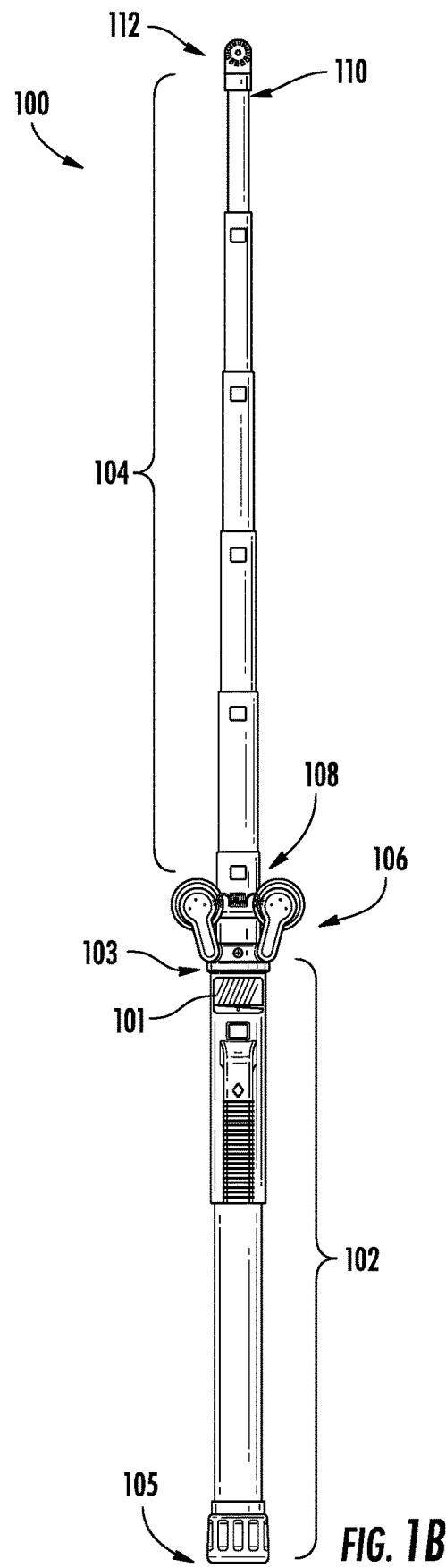
FIG. 1B is a front view of an adjustable insulating device in an extended position according to an example embodiment.

With reference to FIGS. 1A-1B, an example adjustable insulating device 100 of the present disclosure is illustrated. As shown, the adjustable insulating device 100 may include a housing 102, an extendable member 104, and an adjustment mechanism 106 operably coupled with the extendable member 104. As described herein, the extendable member 104 may be configured to be at least partially located within the housing 102 such as in a retracted position as shown in FIG. 1A. In operation, the extendable member 104 may move to an extended position in which at least a portion of the extendable member (e.g., end section 110) may extend beyond an outer edge of the housing 102 as shown in FIG. 1B. In this way, the adjustable insulating device 100 may operate to provide an extendable member 104 that is translated relative the housing 102, via an adjustment mechanism 106 described hereafter, between a retracted position (e.g., FIG. 1A) and an extended position (e.g., FIG. 1B). Although described herein with reference to an example adjustable insulating device 100 (e.g., an adjustable hot stick), the present disclosure contemplates that the embodiments described herein may be equally applicable to other grounding or insulating devices (e.g., shotgun sticks, telescopic sticks, etc.).

The housing 102 of the adjustable insulating device 100 may define an enclosure for receiving or otherwise supporting one or more elements of the adjustable insulating device 100 described herein. As shown, in some embodiments, the housing 102 may be formed as a cylindrical tube (e.g., at least partially hollow) that extends from a second end 105 to a first end 103. Although described herein with reference to a housing 102 having a cylindrical shape, the present disclosure contemplates that the housing 102 may be dimensioned (e.g., sized and shaped) based upon the intended application of the adjustable insulating device 100. In some embodiments, the housing 102 may be formed of a fiberglass material so as to insulate the operator (e.g., electrical lineman) of the adjustable insulating device 100 from electricity. Although described herein with reference to a fiberglass material, the present disclosure contemplates that the housing 102 may be formed of any electrically insulated material.

With continued reference to FIGS. 1A-1B, the extendable member 104 may be formed of a plurality of telescoping sections (e.g., two or more telescoping sections) that may, when in the retracted position illustrated in FIG. 1A, nest within the housing 102. By way of example, the extendable member 104 may include a plurality of cylindrical tubes where each subsequent cylindrical tube (e.g., from the base section 108 to the end section 110) defines an outer diameter that is smaller than that of the preceding cylindric tube. Said differently, the plurality of sections that define the extendable member 104, in some embodiments, are dimensioned (e.g., sized and shaped) so as to telescope (e.g. slide one within another). Although described herein with reference to an extendable member 104 having a cylindrical shape, the present disclosure contemplates that the extendable member 104 may be dimensioned (e.g., sized and shaped) as any shape (e.g. cross-sectional shape) based upon the intended application of the adjustable insulating device 100. In some embodiments, the extendable member 104 may also be formed of a fiberglass material so as to insulate the operator (e.g., electrical lineman) of the adjustable insulating device 100 from electricity. Although described herein with reference to a fiberglass material, the present disclosure contemplates that the extendable material 104 may be formed of any electrically insulated material.

As described above, in operation, the extendable member 104 may move (e.g., translate relative to the housing 102) between a retracted position as illustrated in FIG. 1A and an extended position as illustrated in FIG. 1B via the adjustment mechanism 106 described hereafter. In some embodiments, the extendable member 104 formed of a plurality of telescoping sections may include a base section 108 and an end section 110. As shown, the base section 108 may refer to the telescoping section of the extendable member 104 that has the largest outer diameter (e.g., receives each of the remaining telescoping sections therein when nested). The end section 110 may refer to the telescoping section of the extendable member 104 that has the smallest outer diameter (e.g., the section that is received within each of the telescoping sections when nested). In the retracted position of FIG. 1A, at least the base section 108 is configured to be enclosed by the housing 102 (e.g., proximate the second end 105), and the end section 110 is configured to be disposed proximate the first end 103 of the housing 102. In the extended position of FIG. 1B, the base section 108 is configured to be positioned proximate the first end 103 of the housing 102, and the end section 110 is configured to be positioned beyond an outer edge of the housing 102.

With continued reference to FIGS. 1A-1B, the end section 110 of the extendable member 104 may include a universal connector 112 configured to operably connect with or more tool attachments. The universal connector 112 may be configured to physically and electrically connect with one or more tool attachments such as grounding clamps, voltage testing devices, tooled keys, saws, sockets, screwdrivers, ratchet sets, and the like. Said differently, the universal connector 112 may be configured to engage a tool of any type based upon the intended application of the adjustable insulating device 100. For example the adjustable insulating device 100, via the universal connector 112, may perform voltages tests, tighten nuts and bolts, apply tie wires (e.g., twisted lengths of ductile wire that fasten the running cable to supporting insulators), open and close switches, replace fuses, and/or lay insulating sleeves on wires, among others.

Figure 3:
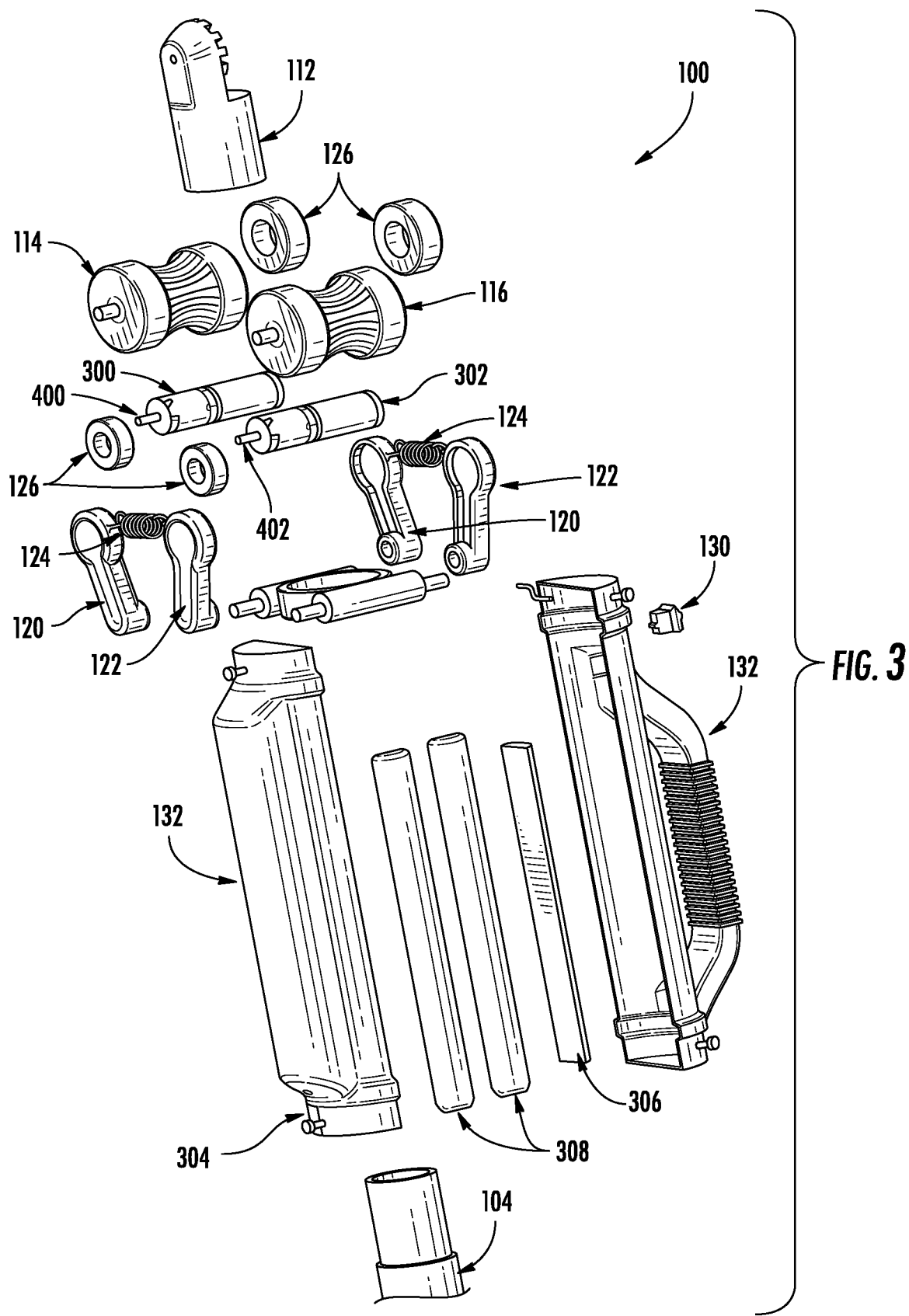
FIG. 3 is an exploded view of a portion of an adjustable insulating device according to an example embodiment.

With reference to FIGS. 2A-3, the adjustable insulating device 102 may include an adjustment mechanism 106 that is operably connected to the extendable member 104. As illustrated and described hereafter, the adjustment mechanism 106 may be, in some embodiments, attached to the housing 102 to operably couple with the extendable member 104. In other embodiments, however, the adjustment mechanism 106 may be located, in whole or in part, separate from the housing 102. In any embodiment, the adjustment mechanism 106 may be configured to cause translation of the extendable member 104 between the retracted position and the extended position.

In some embodiments, as illustrated in FIGS. 2A and 3, the adjustable insulating device 102 may include a first roller 114 rotationally engaged with the extendable member 104 at a first position and a second roller 116 rotationally engaged with the extendable member 104 at a second position. Each of the rollers (e.g., the first roller 114 and the second roller 116) may be configured to rotate about an axis, for example axis 118 for the first roller 114, during operation. As shown in FIG. 2B, the first roller 114 and the second roller 116 may, in some embodiments, define a concave surface configured to contact the extendable member 104. As described above, the extendable member 104 may be dimensioned (e.g., sized and shaped) to have any cross-sectional shape such that the first roller 114 and the second roller 166 may be similarly configured to define a complimentary shape to contact or otherwise engage with the extendable member 104. Although illustrated in FIGS. 2A and 2B at a first position and a second position, respectively, on opposing sides of the extendable member 104, the present disclosure contemplates that the first position and the second position may refer to any location at which the respective first roller 114 and second roller 116 rotationally engage the extendable member 104.

As illustrated in FIG. 3, the surface of the complimentary shape of the first roller 114 and the second roller 116 (e.g., the surface that contacts the extendable member 104) may be configured to provide traction (e.g., frictionally engage) between the rollers 114, 116 and the extendable member 104. By way of example, the surface of the first roller 114 and the second roller 116 may include a rubberized material that maintains contact, via friction or otherwise, with the extendable member 104. Furthermore, the first roller 114 and the second roller 116 may include ridges, dimples, or other surface features configured to promote contact between the rollers 114, 116 and the extendable member 104. Although illustrated and described herein with reference to an adjustable insulating device 100 that includes a first roller 114 and a second roller 116, the present disclosure contemplates that, in some embodiments, only a single roller (and associated motor as described hereafter) may be rotationally engaged with the extendable member 104 and configured to cause translation of the extendable member 104. Similarly, in some embodiments, the adjustable insulating device 100 may include additional rollers positioned at respective locations of the extendable member 104 and configured to rotationally engage the extendable member 104 as described herein.

With reference to the exploded view of FIG. 3, the adjustment mechanism 106 may further include a first motor 300 that is operably coupled with the first roller 114 and, in some embodiments, is housed by the first roller 114. By way of example, the first roller 114 may define a housing or other enclosure configured to support the first motor 300 therein. The first motor 300 may be operably coupled with the first roller 114 via an output shaft 400 of the first motor 300 such that rotation of the output shaft 400 causes rotation of the first roller 114. The first motor 300 may be bi-directional in operation or otherwise configured to output rotation in a clockwise and counterclockwise direction. In order to cause rotation of the first roller 114, the output shaft 400 of the first motor 300 may be substantially aligned with the axis of rotation (e.g., axis 118) of the first roller 114. The first motor 300 may include a brushless direct current (DC) motor, brush DC motor, stepper motor, or any device configured to cause rotation of the first roller 114. The first roller 114 and first motor 300 may utilize one or more bearings 126 to reduce the rotational friction of the first roller 114.

Similarly, the adjustment mechanism 106 may further include a second motor 302 that is operably coupled with the second roller 116 and, in some embodiments, is housed by the second roller 116. By way of example, the second roller 116 may define a housing or other enclosure configured to support the second motor 302 therein. The second motor 302 may be operably coupled with the second roller 116 via an output shaft 402 of the second motor 302 such that rotation of the output shaft 402 causes rotation of the second roller 116. The second motor 302 may be bi-directional in operation or otherwise configured to output rotation in a clockwise and counterclockwise direction. In order to cause rotation of the second roller 116, the output shaft 402 of the second motor 302 may be substantially aligned with the axis of rotation (not shown) of the second roller 116. The second motor 302 may include a brushless direct current (DC)

motor, brush DC motor, stepper motor, or any device configured to cause rotation of the second roller 116. The second roller 116 and second motor 302 may utilize one or more bearings 126 to reduce the rotational friction of the second roller 116. Although described herein with distinct motors 300, 302, the present disclosure contemplates that, in some embodiments, a single motor operably coupled with each roller of the adjustment mechanism 106 may be used.

With continued reference to FIGS. 2A-3, the adjustment mechanism 106 may further include a first set of linkages 120 configured to pivotally attach the first roller 114 to the housing 102. As shown, the first set of linkages 120 may define two (2) arms that each extend from a pivotal connection with the housing 102. Each arm of the first set of linkages 120 may connect with an opposing side of the first roller 114. As described herein, the connection between the first set of linkages 120 and the first roller 114 may be such that the first roller 114 may rotate about the connection between the first set of linkages 120 and the first roller 114 (e.g., along an axis of rotation 118). Similarly, the adjustment mechanism 106 may further include a second set of linkages 122 configured to pivotally attach the second roller 116 to the housing 102. As shown, the second set of linkages 122 may define two (2) arms that each extend from a pivotal connection with the housing 102. Each arm of the second set of linkages 122 may connect with an opposing side of the second roller 116. The connection between the second set of linkages 122 and the second roller 116 may be such that the second roller 116 may rotate about the connection between the second set of linkages 122 and the second roller 116.

As described above, the extendable member 104 may be formed of a plurality of telescoping sections. In order for these telescoping sections to nest within the housing 102 in the retracted position as shown in FIG. 1A, the size (e.g., diameter) of each section may be smaller than that of a preceding section. During operation of the adjustable insulating device 100 as described herein in which the extendable member 104 moves from the retracted position to the extended position, the size of the extendable member 104 between the first roller 114 and the second roller 116 may change. Said differently, as the extendable member 104 moves from the retracted position to the extended position, the outer diameter of the extendable member 104 between the first roller 114 and the second roller 116 may increase. Similarly, as the extendable member 104 moves from the extended position to the retracted position, the outer diameter of the extendable member 104 between the first roller 114 and the second roller 116 may decrease. As such, the pivotal connection between the first set of linkages 120 (attached to the first roller 114) and the housing 102, and the pivotal connection between the second set of linkages 122 (attached to the second roller 116) and the housing 102 allows the distance between the first roller 114 and the second roller 116 to adapt to accommodate the change in outer diameter of the extendable member 104.

As shown in FIGS. 2A and 3, the adjustment mechanism 106 may further include spring elements 124 connected between the first set of linkages 120 and the second set of linkages 122. For example, a first spring element may be attached between one arm of the first set of linkages 120 and one arm of the second set of linkages 122. A second spring element may be similarly attached between the other arm of the first set of linkages 120 and the other arm of the second set of linkages 122. The spring elements may define extension springs that are configured to urge the first roller 114 and the second roller 116 into contact with the extendable member 104. As described above, during operation, the size (e.g., outer diameter) of the extendable member 104 between may varying (e.g., increase or decrease). The pivotal connections of the first roller 114 and the second roller 116 with the housing 102 via the first set of linkages 120 and the second set of linkages 122, respectively, allow for the rollers 114, 116 to adapt to accommodate this change in size. In order to promote positive contact (e.g., sufficient frictional engagement to drive movement of the extendable member 104 as described hereafter), the spring elements 124 may urge the first roller 114 in the direction of the second roller 116, and vice versa. Said differently, as the spring elements 124 are deformed by the change in size of the extendable member 104, the force of the spring elements 124 urge the first roller 114 and the second roller 116 into contact with the extendable member 104. Although described herein with reference to spring elements 124, the present disclosure contemplates that the adjustment mechanism 106 may include any element to ensure or otherwise promote contact between the rollers 114, 116 and the extendable member 104.

With reference to FIGS. 4A-4B, in some embodiments, the housing 102 may further define a handle enclosure 132. The handle enclosure 132 may be attached to the housing 102, in some embodiments, or may be formed integral to the housing 102 (e.g., a single housing 102 that defines the handle enclosure 132). As shown, the handle enclosure 132 may define an ergonomic attachment such that an operator may grasp, carry, control, or otherwise interact with the adjustable insulating device 100. The housing enclosure 132 may, in some embodiments, support an input element 128 that is operably coupled with the adjustment mechanism 106. As described hereafter with reference to FIGS. 5A-5B, the input element 128 may be configured to receive a user input that causes the extendable member 104 to move between the extended position and the retracted position. By way of example, the input element 128 may define a button, slide, tab, or other feature that may be actuated by a user. When actuated in a first direction, the input element 128 may cause, via the adjustment mechanism 106, translation of the extendable member 104 to the extended position. When actuated in a second direction (e.g. opposite the first direction), the input element 128 may cause, via the adjustment mechanism 106, translation of the extendable member 104 to the extended position.

The adjustment insulating device 100 may further include a locking mechanism 130 that is attached to the housing 102 (e.g., the handle enclosure 132) and configured to, when actuated, prevent translation of the extendable member 104. By way of example, the locking mechanism 130 may define a pin or similar feature that, prior to actuation, is disposed adjacent the extendable member 104. When actuated, this feature may move into engagement with the extendable member 104 (e.g., received by a corresponding slot of the extendable member 104 or the like) and impede or otherwise prevent translation of the extendable member 104. Although described herein with reference to a physical locking mechanism 130 (e.g., that physically impedes or obstructs movement of the extendable member 104), the present disclosure contemplates that the locking mechanism 130 may also include electromagnetic locking mechanism, cam locking mechanisms, or the like.

With continued reference to FIG. 4B, the handle enclosure 132 may further include control circuitry 306 supported therein that is operably coupled with the adjustment mechanism 106. In some instances, the control circuitry 306 may include passive circuitry elements (e.g., electrical connections, traces, etc.) configured to direct electrical signals. In such an embodiment, the control circuitry 306 may be configured to receive an input via the input element 128 indicative of an instruction to extend the extendable member 104 and may direct electrical current to the first motor 300 and/or the second motor 302 to rotate the motors 300, 302 in a direction that causes the extendable member 104 to extend. Similarly, the control circuitry 306 may be configured to receive an input via the input element 128 indicative of an instruction to retract the extendable member 104 and may direct electrical current to the first motor 300 and/or the second motor 302 to rotate the motors 300, 302 in a direction that causes the extendable member 104 to retract.

In some embodiments, the control circuitry 306 may include active circuitry components (e.g., a controller, a computing device, etc.) configured to control operation of the adjustment mechanism 106 (e.g., the motors 300, 302). In such an embodiment, the control circuitry 306 may be embodied in any number of different ways and may, for example, include one or more processing devices configured to perform independently. Furthermore, the control circuitry 306 (e.g., controller) may be understood to include a single core processor, a multi-core processor, and/or the like. By way of example, the control circuitry 306 (e.g. controller) may be configured to execute instructions stored in a memory or otherwise accessible to one or more processors of the control circuitry 306 (e.g. controller). Alternatively or additionally, the control circuitry 306 (e.g. controller) may be configured to execute hard-coded functionality. As such, whether configured by hardware or by a combination of hardware with software, the control circuitry 306 (e.g. controller) may represent an entity (e.g., physically embodied in circuitry) capable of performing operations according to an embodiment of the present invention while configured accordingly.

In some embodiments, the adjustable insulating device 100 may further include a position sensor operably connected to the adjustment mechanism 106 and the control circuitry 306. The position sensor may be configured to determine the relative position of the extendable member 104 and the housing 102. By way of example, the position sensor may include a displacement transducer, hall effect sensor, linear variable different transformer (LVDT), photodiode array, linear encoder, optical proximity sensor, or the like configured to determine the position of the end section 110 of the extendable member relative the housing 102 and, via the control circuitry 306, determine an extended distance of the extendable member (e.g., a distance between the first end 103 of the housing 102 and the end section 110). In some embodiments, the control circuitry 306 may output the determined distance (e.g., an extended distance) and/or a torque experienced by the insulating device 100 to a display 101 of the adjustable insulating device 100.

With continued reference to FIG. 4B, the adjustable insulating device 100 may further include an internal power source 308 (e.g., battery) supported by the handle enclosure 132 and operably coupled with the control circuitry 306 and the adjustment mechanism 106. The internal power source 308 may be configured to supply power to the motors 300, 302, the control circuitry 306, the input element 128, the locking mechanism 130, or any other electrically powered element of the adjustable insulating device 100. In instances in which the internal power source 308 is a rechargeable battery, a power input connection 304 operably coupled with the internal power source 308 may be provided. The power input connection 304 may be configured to electrically connect the internal power source 308 with an external power source (not shown) so as to supply power to the internal power source 308 (e.g., charge a battery).

Figure 5A:
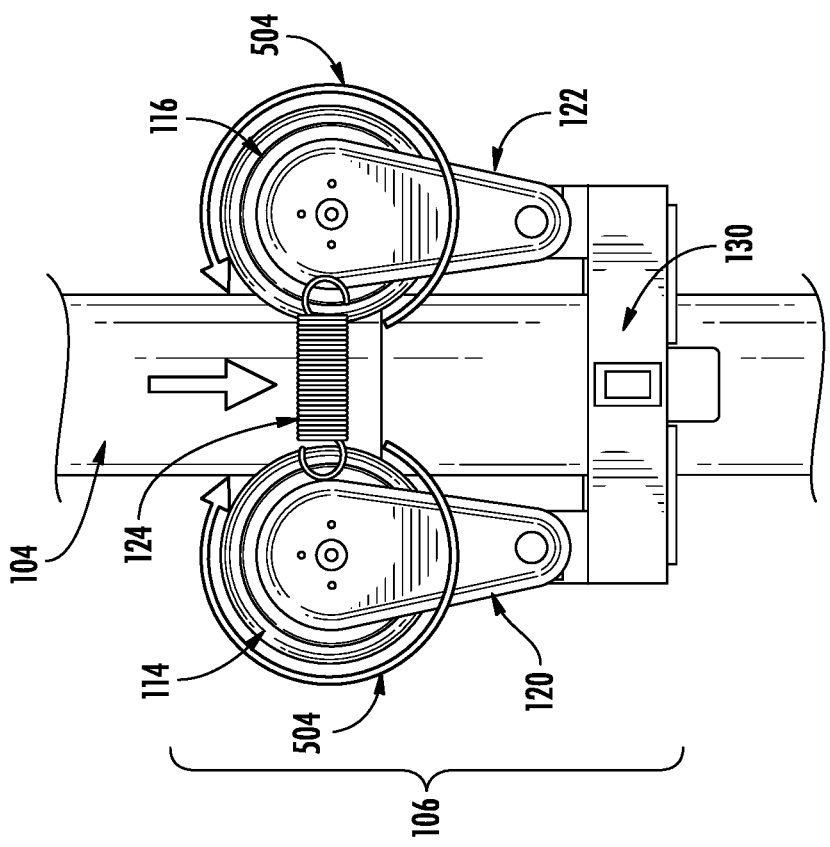
FIGS. 5A-5B are enlarged views of motorized rollers during extension and retraction, respectively, of an example extendable member according to an example embodiment.
Figure 5B:
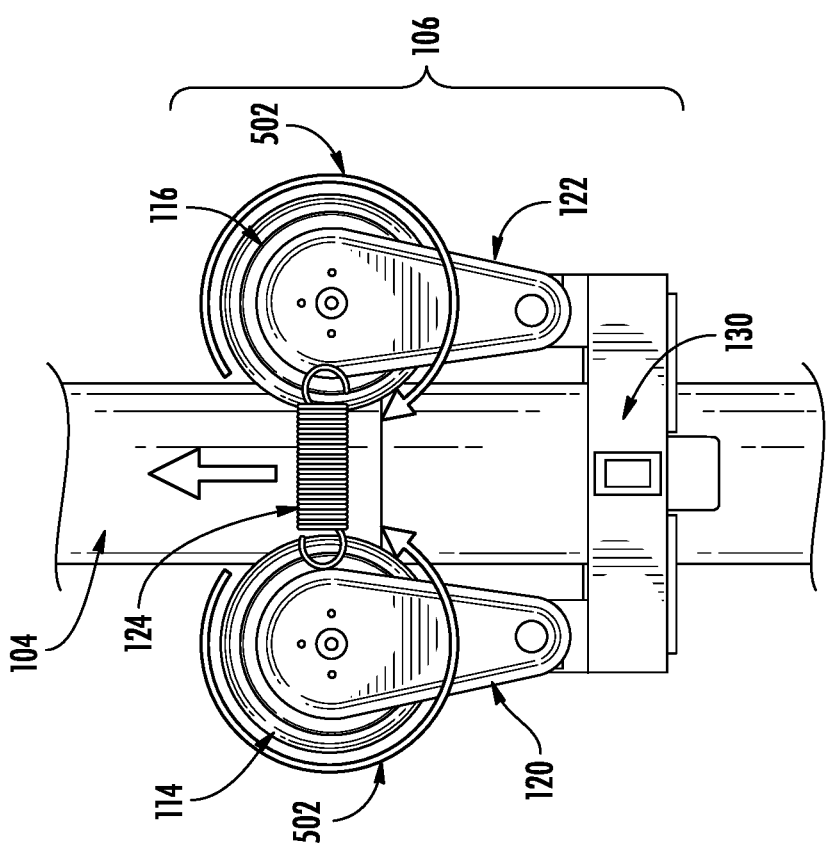

With reference to FIGS. 5A-5B, example extension and retraction operations, respectively are illustrated. As shown in FIG. 5A, the adjustment mechanism 106 may receive a user input (via the input element 128) to extend the extendable member 104. The actuation of the input element 128 may supply power to the first motor 300 and the second motor 302 and cause rotation of the respective output shafts 400, 402 of the first motor 300 and the second motor 302. The rotation of the output shaft 400 may cause the first roller 114 to rotate in a counterclockwise direction, and the output shaft 402 may cause the second roller 116 to rotate in a clockwise direction (e.g., rotation directions 502). Due to rotational engagement between the first roller 114 and the second roller 116 with the extendable member 104 (e.g., as facilitated by the friction between these elements), the extendable member 104 may translate relative to the housing 102 toward the extended position (e.g., be driven to an extended position).

As shown in FIG. 5B, the adjustment mechanism 106 may receive a user input (via the input element 128) to retract the extendable member 104. The actuation of the input element 128 may supply power to the first motor 300 and the second motor 302 and cause rotation of the respective output shafts 400, 402 of the first motor 300 and the second motor 302. The rotation of the output shaft 400 may cause the first roller 114 to rotate in a clockwise direction, and the output shaft 402 may cause the second roller 116 to rotate in a counter-clockwise direction (e.g., rotation directions 504). Due to rotational engagement between the first roller 114 and the second roller 116 with the extendable member 104 (e.g., as facilitated by the friction between these elements), the extendable member 104 may translate relative to the housing 102 toward the retracted position (e.g., be driven to a retracted position).

As such, the apparatuses, systems, and associated methods of the present application address the deficiencies of conventional systems by utilizing an adjustment mechanism configured to translate an extendable member between a retracted and an extended position via one or more motorized roller systems. In this way, the described adjustable insulating device may effectively and efficiently extend to and retract from operational heights removing or otherwise reducing the potential danger to a lineman associated with the device.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An adjustable insulating device comprising:
a housing that comprises a handle enclosure;
an extendable member configured to be at least partially located within the housing, wherein the extendable member is configured to move between a retracted position and an extended position;
an adjustment mechanism operably coupled with the extendable member, wherein the adjustment mechanism is configured to cause translation of the extendable member between the retracted position and the extended position; and a control circuitry supported by the handle enclosure and operably coupled with the adjustment mechanism.

2. The adjustable insulating device according to claim 1, wherein the extendable member is formed of two or more telescoping sections.

3. The adjustable insulating device according to claim 2, wherein, in the retracted position, telescoping sections of the extendable member are configured to nest within the housing.

4. The adjustable insulating device according to claim 1, wherein the housing defines a first end and a second end opposite the first end.

5. The adjustable insulating device according to claim 4, wherein the extendable member comprises a base section and an end section, wherein:
in the retracted position, the base section is configured to be enclosed by the housing, and the end section is configured to be disposed proximate the first end of the housing; and
in the extended position, the base section is configured to be positioned proximate the first end of the housing, and the end section is configured to be positioned beyond an outer edge of the housing.

6. The adjustable insulating device according to claim 5, wherein the end section comprises a universal connector configured to operably connect with or more tool attachments.

7. The adjustable insulating device according to claim 1, wherein the housing and the extendable member are formed of an electrically insulating material.

8. The adjustable insulating device according to claim 1, wherein the adjustment mechanism further comprises:
a roller rotationally engaged the extendable member; and
a motor operably connected with the roller such that an output of the motor causes rotation of the roller, wherein the output of the motor is configured to cause translation of the extendable member between the retracted position and the extended position.

9. The adjustable insulating device according to claim 1, wherein the adjustment mechanism further comprises:
a first roller rotationally engaged with the extendable member at a first position, wherein the first roller houses a first motor; and
a second roller rotationally engaged with the extendable member at a second position, wherein the second roller houses a second motor,
wherein a first output of the first motor and a second output of the second motor are configured to cause translation of the extendable member between the retracted position and the extended position.

10. The adjustable insulating device according to claim 9, wherein a first output shaft of the first motor is substantially aligned with an axis of rotation of the first roller, and a second output shaft of the second motor is substantially aligned with an axis of rotation of the second roller.

11. The adjustable insulating device according to claim 10, wherein the adjustment mechanism further comprises:
a first set of linkages configured to pivotally attach the first roller to the housing; and
a second set of linkages configured to pivotally attach the second roller to the housing.

12. The adjustable insulating device according to claim 11, wherein the adjustment mechanism further comprises spring elements connected between the first set of linkages and the second set of linkages, wherein the spring elements are configured to urge the first roller and the second roller into contact with the extendable member.

13. The adjustable insulating device according to claim 10, wherein the adjustment mechanism further comprises one or more bearings configured to reduce rotational friction of the first roller and the second roller.

14. The adjustable insulating device according to claim 1, further comprising an input element operably coupled with the adjustment mechanism and configured to receive a user input.

15. The adjustable insulating device accordingly to claim 14, wherein the input element is configured to:
when actuated in a first direction, cause translation of the extendable member to the extended position; and
when actuated in a second direction, cause translation of the extendable member to the extended position.

16. The adjustable insulating device according to claim 1, further comprising a locking mechanism attached to the housing and configured to, when actuated, prevent translation of the extendable member.

17. The adjustable insulating device according to claim 1, further comprising:
an internal power source supported by the handle enclosure and operably coupled with the control circuitry and the adjustment mechanism; and
a power input connection operably coupled with the internal power source and configured to electrically connect the internal power source with an external power source.

18. The adjustable insulating device according to claim 17, further comprising a position sensor operably connected to the adjustment mechanism, the control circuitry, and the internal power source, wherein the position sensor is configured to determine a relative position of the extendable member and the housing.

* * * * *